United States Patent
Schultz et al.

[11] Patent Number: 6,068,022
[45] Date of Patent: May 30, 2000

[54] JET PUMP WITH IMPROVED CONTROL VALVE AND PRESSURE RELIEF VALVE THEREFORE

[75] Inventors: Jeffrey A. Schultz, Pittsville; Muhammad S. Malik, Forest, both of Va.

[73] Assignee: Schrader-Bridgeport International, Inc., Buffalo Grove, Ill.

[21] Appl. No.: 09/382,846

[22] Filed: Aug. 25, 1999

[51] Int. Cl.[7] .................................................... F16K 15/00
[52] U.S. Cl. ........................................... 137/538; 137/540
[58] Field of Search .................................. 137/538, 540, 137/535

[56] References Cited

U.S. PATENT DOCUMENTS

| | | | |
|---|---|---|---|
| 3,612,099 | 10/1971 | MacManus | 137/454.5 |
| 4,213,021 | 7/1980 | Alexander | 137/540 |
| 4,350,176 | 9/1982 | Lace | 137/540 |
| 4,350,179 | 9/1982 | Bunn et al. | 137/540 |
| 4,936,339 | 6/1990 | Bennett | 137/540 |
| 5,265,642 | 11/1993 | Buckminster et al. | 137/540 |
| 5,435,337 | 7/1995 | Kemp | 137/540 |

*Primary Examiner*—Gregory L. Huson
*Assistant Examiner*—Joanne Y. Kim
*Attorney, Agent, or Firm*—Brinks Hofer Gilson & Lione

[57] ABSTRACT

A jet pump includes a jet pump nozzle and a pressure relief valve. The pressure relief valve includes an inlet, a valve seat around the inlet, and an unregulated outlet downstream of the valve seat. A valve member is mounted in the valve body to move between a closed position and an open position, and a spring reacts against the valve body to bias the valve member to the closed position. The valve seat defines a first area A1, the valve member defines a second area A2, and the ratio A2/A1 is selected to provide a hysteresis between opening and closing pressures as measured at the inlet of at least 6 psi. This hysteresis improves efficiency of operation of the jet pump nozzle.

7 Claims, 2 Drawing Sheets

JET PUMP WITH IMPROVED CONTROL VALVE AND PRESSURE RELIEF VALVE THEREFORE

BACKGROUND

The present invention relates to jet pumps, and in particular to a jet pump including an improved control valve that can be manufactured at low cost.

Jet pumps have been used in the past to improve operation of the fuel delivery system of an automotive vehicle. One prior system is intended for use with a fuel tank having at least two chambers. The fuel pump inlet is disposed in an inlet chamber, which is generally in fluid communication with the main chamber of the fuel tank. The outlet of the fuel pump is applied to the engine being supplied by the fuel pump through a pressure regulator. The pressure regulator feeds fuel at a regulated pressure to the fuel rail at the engine, and a jet pump nozzle is fed from the main fuel pump in the fuel tank.

Pressure regulators of the type described above are relatively expensive to manufacture, and a need presently exists for an improved jet pump that can perform the function of the jet pump described above, but that can be manufactured at a lower cost.

SUMMARY

The jet pump described below in conjunction with the drawings includes a pressure relief valve and a jet pump nozzle. The pressure relief valve provides an outlet flow that is not pressure regulated as in the prior art described above. Instead, the pressure relief valve is designed to provide a hysteresis between the opening and closing pressures as measured at the inlet at the valve. This hysteresis reduces the time during which the pressure relief valve is partially open and increases the time during which the valve is either fully opened or fully closed. This provides an important advantage to jet pump operation, in that a partially open pressure relief valve can result in low flow rates and inefficient jet pump operation.

The foregoing paragraph has been provided by way of introduction, and is not intended to limit the scope of the following claims.

DETAILED DESCRIPTION OF THE PRESENTLY PREFERRED EMBODIMENTS

Figure 1:
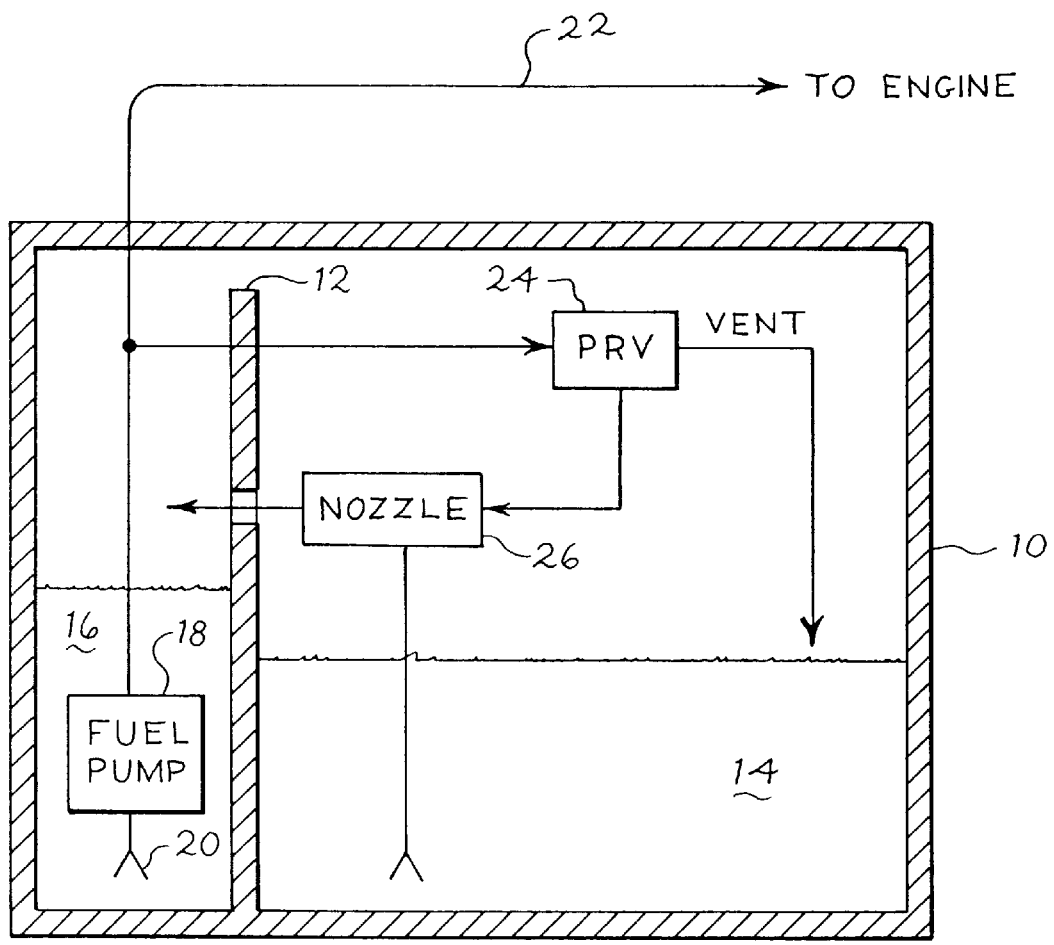
FIG. 1 is a block diagram of a jet pump that incorporates a preferred embodiment of this invention.

As shown in FIG. 1, a jet pump including a pressure relief valve 24 and a jet pump nozzle 26 is shown installed in a fuel delivery system of the prior art. This fuel delivery system includes a tank 10, such as a fuel tank of a vehicle. The tank 10 is divided by a partition 12 that extends only partially up the height of the tank 10. The partition 12 divides the tank 10 into a main chamber 14 and an inlet chamber 16.

A fuel pump 18 draws fuel from the inlet chamber 16 via a fuel pump inlet 20, and the fuel pump 18 supplies fuel under pressure via a fuel pump outlet 22 to an engine (not shown).

As shown in FIG. 1, the pressure relief valve 24 receives fuel under pressure from the outlet 22 of the fuel pump 18. When the fuel supplied by the fuel pump 18 is below the opening pressure of the pressure relief valve 24, the pressure relief valve 24 remains closed, and fuel is not passed by the pressure relief valve 24 to the nozzle 26. When the fuel pressure supplied to the valve 24 exceeds the opening pressure of the valve 24, the valve 24 opens and fuel under pressure is passed from the fuel pump 18 to the nozzle 26 via the valve 24. Leakage through the valve is vented back to the main chamber 14.

The nozzle 16 uses pressurized fuel from the valve 24 to entrain additional fuel from the main chamber 14, and to direct the entire flow, including both the flow from the valve 24 and entrained flow, from the main chamber 14, across an opening in the partition 12, into the inlet chamber 16. In this way, the inlet chamber 16 is filled and the fuel pump inlet 20 is not starved for fuel when the tank 10 is laterally accelerated.

Figure 2:
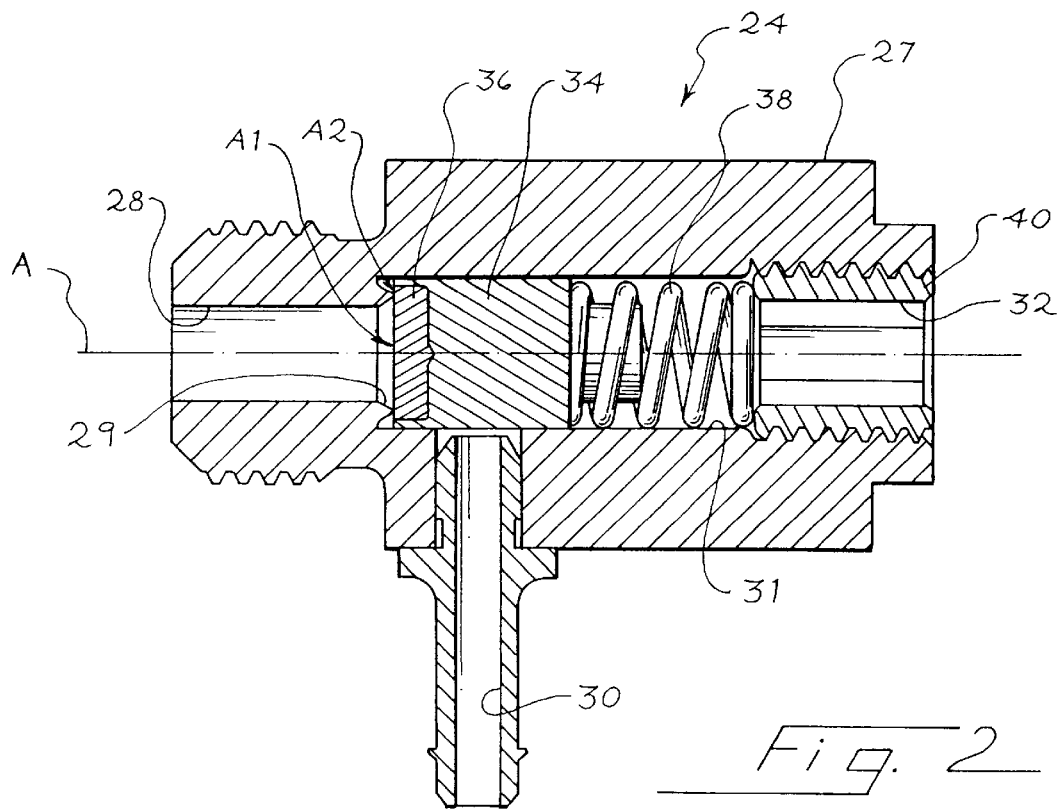
FIG. 2 is a cross-sectional view of the pressure relief valve of FIG. 1.

FIG. 2 provides a cross-sectional view of the valve 24. As shown in FIG. 2, the valve 24 includes a valve body 27 that defines an inlet 28, a valve seat 29 around the inlet 28, and an outlet 30. The inlet 28 is coupled to receive pressurized fluid from the fuel pump 18, as shown in FIG. 1, and the outlet 30 is connected to the jet pump nozzle 26, shown in greater detail in FIG. 3.

Returning to FIG. 2, the valve body 27 defines a guide 31, that in this embodiment is formed as a cylindrical bore. A valve member 34 is mounted to fit closely within the guide 31 to minimize leakage but to slide freely in the guide 31. The valve member 34 supports at one end an elastomeric pad 36 that is positioned to seal against the valve seat 29 when the valve member 34 is in the closed position shown in FIG. 2.

The valve member 34 is biased to the closed position of FIG. 2 by a spring 38 that reacts against a set screw 40. The set screw 40 is threaded into the valve body 27, and the spring 38 therefore reacts against the valve body 27 to bias the valve member 34 to the left as shown in FIG. 2. The set screw 40 defines a vent 32 extending axially therethrough. This vent 32 is in fluid communication with the main chamber 14 of FIG. 1, and the vent 32 prevents back pressure on the valve member 34 from exceeding the pressure of the tank 10.

Figure 3:
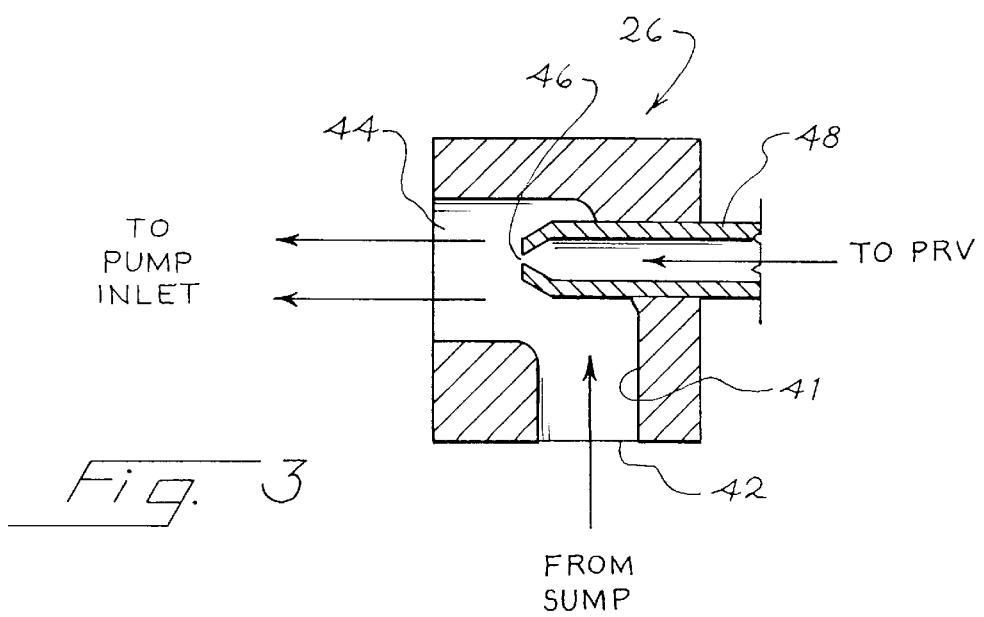
FIG. 3 is a cross-sectional view of the nozzle of FIG. 1.

As shown in FIG. 3, the jet pump nozzle 26 defines a passage 41 that includes an inlet 42 and an outlet 44. The inlet 42 is in fluid communication with a lower portion of the main chamber 14 (FIG. 1) and the outlet 44 is in fluid communication with the inlet chamber 16 (FIG. 1). The jet pump nozzle 26 includes a tube 48 that terminates at one end in an orifice 46. The other end of the tube 48 is connected by a flexible tube (not shown) to the outlet 30 of the pressure relief valve 24.

In order to improve efficiency of operation of the jet pump, the pressure relief valve 24 provides a hysteresis of at least about 6 psi between the pressure at the inlet 28 at which the valve 24 opens, and the pressure at the inlet 28 at which the valve 24 closes. In the following discussion, the reference symbol A1 will be used for the cross-sectional area of the valve seat 29, i.e., the area of the pad 36 on which the pressure at the inlet 24 acts when the pad 36 is against the valve seat 29. The reference symbol A2 will be used for the cross-sectional area of the valve member 34, i.e., the area of the valve member 34 on which the pressure at the inlet 24 acts when the pad 36 is lifted off of the valve seat 29. The valve 24 opens when the product of the pressure at the inlet 24 times the area A1 exceeds the biasing force applied by the spring 38. When this occurs, the inlet pressure causes the valve member 34 to move to the right as shown in FIG. 2, thereby lifting the elastomeric pad 36 off of the valve seat 29. When this occurs, the inlet pressure acts on the full area A2 of the valve member 34, thereby increasing the force pushing the valve member 34 to the right as shown in FIG. 2, against the biasing force of the spring 38. In this embodiment, the cross-section area A2 of the valve member 34 is about 167% greater than the cross-sectional area A1 of the valve seat 29. In general, it is preferred, though not required, that the ratio A2/A1 be greater than 110%. This causes the valve member 34 to be moved quickly to the right in the view of FIG. 2 to an open position, thereby exposing the outlet 30. As inlet pressure drops, the valve member 34 remains in the open position until the inlet pressure drops approximately 6 psi below the inlet pressure required to open the valve. At this point, the biasing force supplied by the spring 38 moves the valve member 34 to the left as shown in FIG. 2 to rapidly close the valve.

Because of the hysteresis described above, the valve 24 opens and closes crisply. This prevents the valve 24 from remaining in a partially open state for any extended period of time, and ensures that the fluid flow to the jet pump nozzle 26 is either fully on or fully off for the large majority of the time. This increases jet pump operation efficiency.

Crisp operation of the valve 24 is enhanced by the fact that back pressure on the valve member 34 is carefully controlled. Because the valve member 34 fits snuggly in the guide 31, leakage past the valve member 34 from the inlet 28 to the area of the spring 38 is minimized. Any leakage that does occur is allowed to discharge through the vent 32 back to the main chamber 14, and back pressure within the valve body 27 is in this way controlled.

By way of example, the following details of the construction for the preferred embodiment have been found suitable. Of course, these details are not intended to limit the scope of this invention. In this example, the valve body 27 is formed of any suitable material such as brass, stainless steel, or the like. The illustrated inlet 28, valve seat 29, valve member 34 and pad 36 can be circularly symmetrical about the axis A, and the large diameter portion of the valve body 27 can be provided with a hexagonal shape to allow use of a conventional wrench. The portion of the valve body adjacent the inlet 28 is preferably threaded to receive a conventional fluid fitting. The elastomeric pad 36 is preferably formed of a material that is resistant to degradation from the fluid passing through the valve 24. The following dimensions and operating conditions have been found suitable for use in one application, where the fuel pump has a nominal output pressure of 50 psi:

| Parameter | Dimension |
| --- | --- |
| A1 | 13.2 cm$^2$ |
| A2 | 22.0 cm$^2$ |
| opening pressure | 50 psi |
| closing pressure | 44 psi |
| flow rate in open position | 8 grams/sec. |

Of course, a wide range of changes and modifications can be made to the preferred embodiment described above. Any suitable jet pump nozzle can be used, and the jet pump of this invention is not limited to use in combination with an automotive fuel pump. The jet pump of this invention can be used in other applications, and the pressure relief valve described above can be used in applications other than a jet pump, where the hysteresis and crisp opening and closing of the pressure relief valve are advantageous. The materials, dimensions and proportions can all be adapted for the particular application, and in some applications plastic materials can be used for the various components.

The foregoing detailed description has discussed only a few of the many forms that this invention can take. This detailed description is therefore intended only by way of illustration. It is the following claims, including all equivalents, that are intended to define the scope of this invention.

We claim:

1. A jet pump comprising:
   a pressure relief valve comprising:
      a valve body that comprises an inlet, a valve seat around the inlet downstream of the inlet, and an unregulated outlet downstream of the valve seat;
      a valve member mounted to move between a closed position, in which the valve member seals against the valve seat to block fluid flow from the inlet to the outlet, and an open position, in which the valve member permits fluid flow from the inlet to the outlet; and
      a spring reacting against the valve body to bias the valve member to the closed position; and
   a jet pump nozzle connected to the valve body to receive fluid flow from the outlet;
   wherein the valve seat defines a first area A1, wherein the valve member defines a second area A2, and wherein the ratio A2/A1 is selected to provide a hysteresis between opening and closing pressures as measured at the inlet of at least 6 psi.

2. The invention of claim 1 wherein the pressure relief valve further comprises a vent disposed on an opposite side of the valve member from the valve seat, said valve member disposed between the outlet and the vent when the valve member is in the open position.

3. The invention of claim 1 wherein the ratio A2/A1 is greater than 110%.

4. A pressure relief valve comprising:
   a valve body that comprises an inlet, a valve seat around the inlet downstream of the inlet and an unregulated outlet downstream of the valve seat;
   a valve member mounted to move between a closed position, in which the valve member seals against the valve seat to block fluid flow from the inlet to the outlet, and an open position, in which the valve member permits fluid flow from the inlet to the outlet; and
   a spring reacting against the valve body to bias the valve member to the closed position; and
   a vent disposed on an opposite side of the valve member from the valve seat, said valve member disposed between the outlet and the vent when the valve member is in the open position;
   wherein the valve seat defines a first area A1, wherein the valve member defines a second area A2, and wherein the ratio A2/A1 is selected to provide a hysteresis between opening and closing pressures as measured at the inlet of at least 6 psi.

5. The invention of claim 4 wherein the ratio A2/A1 is greater than 110%.

6. The invention of claim 4 wherein the outlet is disposed in a sidewall of the valve body, between the valve seat and the valve member when the valve member is in the open position.

7. The invention of claim 6 wherein the valve body comprises a guide, and wherein the valve member fits closely in the guide to limit leakage past the valve member and out the vent when the valve member is in the open position.

* * * * *